United States Patent
Fontenot et al.

(10) Patent No.: US 9,734,078 B2
(45) Date of Patent: *Aug. 15, 2017

(54) RESETTING MEMORY LOCKS IN A TRANSACTIONAL MEMORY SYSTEM

(71) Applicant: INTERNATIONAL BUSINESS MACHINES CORPORATION, Armonk, NY (US)

(72) Inventors: Nathan Fontenot, Georgetown, TX (US); Ryan Patrick Grimm, Austin, TX (US); Robert Cory Jennings, Jr., Austin, TX (US); Joel Howard Schopp, Austin, TX (US); Michael Thomas Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 14/841,599

(22) Filed: Aug. 31, 2015

(65) Prior Publication Data

US 2016/0070650 A1   Mar. 10, 2016

Related U.S. Application Data

(63) Continuation of application No. 14/481,997, filed on Sep. 10, 2014, now Pat. No. 9,524,246.

(51) Int. Cl.
*G06F 12/08* (2016.01)
*G06F 12/14* (2006.01)
(Continued)

(52) U.S. Cl.
CPC ......... *G06F 12/0891* (2013.01); *G06F 5/065* (2013.01); *G06F 9/467* (2013.01);
(Continued)

(58) Field of Classification Search
None
See application file for complete search history.

(56) References Cited

U.S. PATENT DOCUMENTS 7,444,329 B2 * 10/2008 Harris ............... G06F 9/466
7,844,973 B1    11/2010 Dice
(Continued)

OTHER PUBLICATIONS

Tran, Denise, Notice of Allowance, U.S. Appl. No. 14/481,997, The United States Patent and Trademark Office, Aug. 19, 2016, pp. 1-17, (relevant pp. 1-17).
(Continued)

*Primary Examiner* — Denise Tran
(74) *Attorney, Agent, or Firm* — Yudell Isidore PLLC (57) ABSTRACT

A method for resetting of memory locks in a transactional memory system. The method includes a processor setting at least one new memory lock during execution of a transaction that acquires access to a region of memory. The new memory lock indicates that the transaction and its associated thread have exclusive temporary access to the memory region. The method further includes determining if a first in first out (FIFO) memory lock register is full of memory locks and, in response to the FIFO memory lock register being full, a memory lock is removed from a tail position of the FIFO memory lock register. The removed memory lock is reset to return to a transactional memory state and the new memory lock is added to a head position in the FIFO memory lock register.

7 Claims, 5 Drawing Sheets

(51) Int. Cl.
  *G06F 5/06* (2006.01)
  *G06F 13/16* (2006.01)
  *G06F 9/46* (2006.01)
  *G06F 12/0891* (2016.01)
  *G06F 5/14* (2006.01)

(52) U.S. Cl.
  CPC ...... *G06F 12/1466* (2013.01); *G06F 12/1475* (2013.01); *G06F 13/1663* (2013.01); *G06F 5/14* (2013.01); *G06F 2205/067* (2013.01); *G06F 2212/1052* (2013.01)

(56) References Cited

U.S. PATENT DOCUMENTS

| | | |
|---|---|---|
| 8,122,168 B2 | 2/2012 | Duggirala |
| 8,402,464 B2 | 3/2013 | Dice et al. |
| 2008/0109807 A1* | 5/2008 | Rosenbluth ............. G06F 9/526 718/102 |
| 2009/0249356 A1 | 10/2009 | He |
| 2010/0275209 A1 | 10/2010 | Detlefs |
| 2013/0097607 A1 | 4/2013 | Lewis |
| 2016/0070650 A1 | 3/2016 | Fontenot |
| 2016/0070660 A1* | 3/2016 | Fontenot ............. G06F 12/0891 711/152 |

OTHER PUBLICATIONS

Tran, Denise, Non-Final Office Action, U.S. Appl. No. 14/481,997, The United States Patent and Trademark Office, Apr. 8, 2016, pp. 1-10, (relevant pp. 1-10).

* cited by examiner

| Memory Lock | Position 320 | Transaction 330 | Memory Lock Region 340 |
|---|---|---|---|
| 351 | 0 | 11010 (332) | AFDA00 |
| 352 | 1 | 11101 (334) | 33CE80 |
| 353 | 2 | 00010 | B2DF52 |
| 354 | 3 | 01111 | 21AB82 |
| 355 | 4 | 10100 | 73DC58 |
| 356 | 5 | 11111 | C5A416 |
| 357 | 6 | 00001 | D6CB10 |
| 358 | 7 | 11011 | FA5910 |

| Memory Lock | Position 320 | Transaction 330 | Memory Lock Region 340 |
|---|---|---|---|
| 360 | 0 | 01100 | BC7833 |
| 351 | 1 | 11010 (332) | AFDA00 |
| 352 | 2 | 11101 (334) | 33CE80 |
| 353 | 3 | 00010 | B2DF52 |
| 354 | 4 | 01111 | 21AB82 |
| 355 | 5 | 10100 | 73DC58 |
| 356 | 6 | 11111 | C5A416 |
| 357 | 7 | 00001 | D6CB10 |

← ADD TO REGISTER 358 11011/FA5910
REMOVE FROM REGISTER AND RESET

*FIG. 3B*

FIG. 4

RESETTING MEMORY LOCKS IN A TRANSACTIONAL MEMORY SYSTEM

PRIORITY CLAIM

The present application is a continuation of U.S. patent application Ser. No. 14/481,997, filed on Sep. 10, 2014, the content of which is incorporated herein by reference in its entirety.

BACKGROUND

1. Technical Field

The present invention generally relates to computer systems. More specifically, the present invention relates to a method and system for resetting memory locks in a transactional memory system.

2. Description of the Related Art

Computer systems that include multiple processors allow multiple concurrent executing threads to access shared memory locations. Writing multi-threaded programs is difficult due to the complexities of coordinating concurrent memory access. One approach to concurrent control between multiple threads of execution is the utilization of transactional memory. In a transactional memory system, a section of code (e.g., an execution path or a set of program instructions) is designated as a transaction. The transaction executes atomically with respect to other threads of execution within the transactional memory system. For example, if the transaction includes two memory write operations, then the transactional memory system ensures that all other threads may only observe either the cumulative effects of both memory operations or of neither, but not the effects of only one.

When transactions heavily contest a region of memory, lock elision using memory locks can be used. A memory lock guarantees that the thread has exclusive access to shared data for a section of code. A thread acquires the lock and executes its critical section. Unfortunately, it is difficult to release the memory lock for highly contested transactions back to transactional memory. Because of the processing overhead associated with measuring contested transactions, it is not possible to measure successful accesses without contested transactions, and as such only contested transactions can be measured. Transactional memory is not very useful in many applications because even transactions that have very occasional contested transactions will revert to taking memory locks over time. The result is that over time a large percentage of transactions will have memory locks that cannot be released.

BRIEF SUMMARY

Disclosed is a method for resetting of memory locks in a transactional memory system.

The method includes a processor setting at least one new memory lock during execution of a transaction that acquires access to a region of memory. The new memory lock indicates that the transaction and its associated thread have exclusive temporary access to the memory region. The method further includes determining if a first in first out (FIFO) memory lock register is full of memory locks and in response to the FIFO memory lock register being full, a memory lock is removed from a tail position of the FIFO memory lock register. The removed memory lock is reset to return to a transactional memory state and the new memory lock is added to a head position in the FIFO memory lock register.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, system and computer program product for resetting memory locks in a transactional memory system. With the method, a processor sets at least one new memory lock during execution of a transaction that acquires access to a region of memory. The new memory lock indicates that the transaction and its associated thread have exclusive temporary access to the memory region. The method further determines if a first in first out (FIFO) memory lock register is full of memory locks and in response to the FIFO memory lock register being full, a memory lock is removed from a tail position of the FIFO memory lock register. The removed memory lock is reset to return to a transactional memory state and the new memory lock is added to a head position in the FIFO memory lock register.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
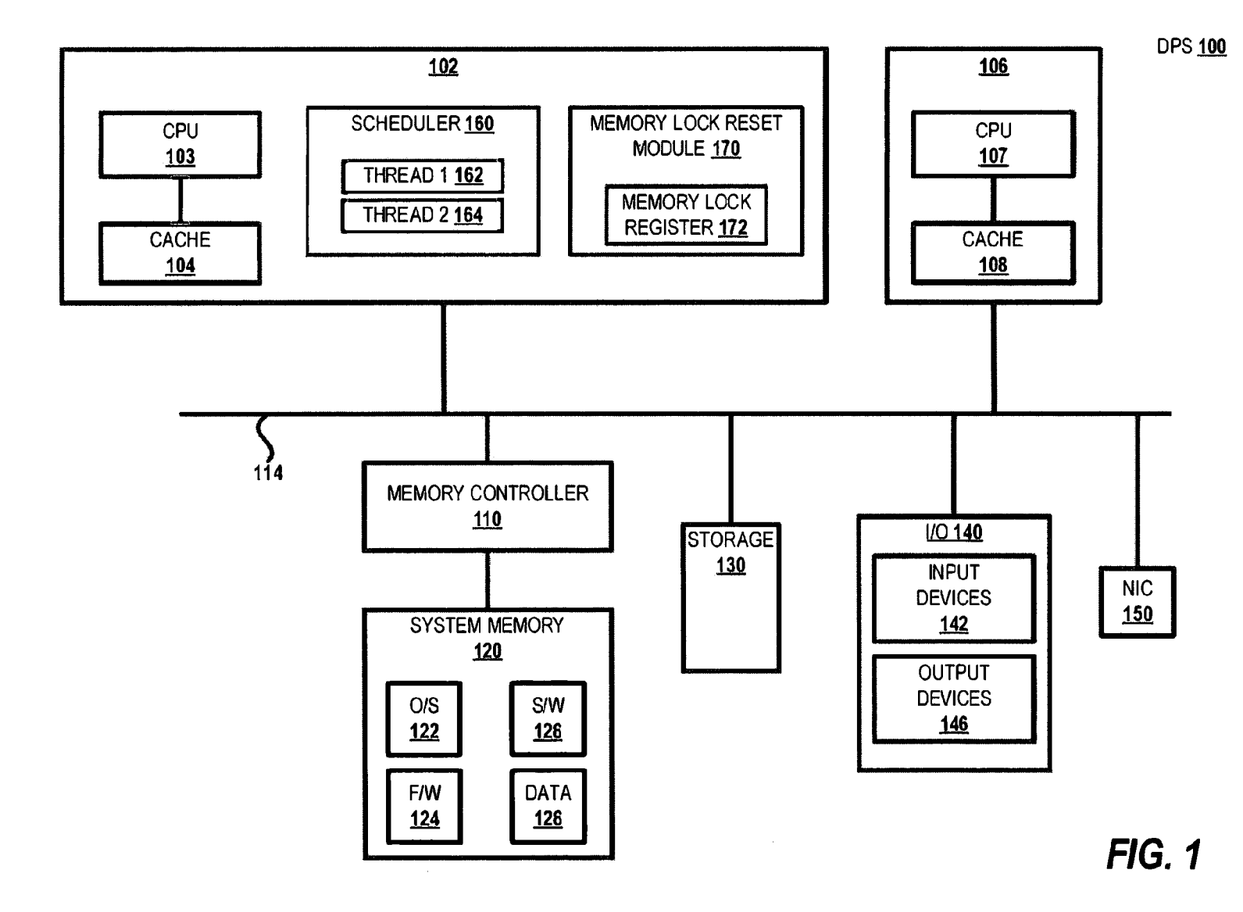
FIG. 1 provides a block diagram representation of an example data processing system within which one or more of the described embodiments can be practiced.

With reference now to the figures, and beginning with FIG. 1, there is depicted a block diagram representation of an example data processing system (DPS), as utilized within one embodiment. The data processing system can be described as having features common to a server computer. However, as used herein, the term "data processing system" is intended to include any type of computing device or machine that is capable of receiving, storing and running a software product and retrieving data/instructions from a storage device. Therefore the DPS can include not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the described embodiments. While embodiments will be described in the general context of instructions residing on hardware within a computer, those skilled in the art will recognize that embodiments may be implemented in a combination of program modules running in an operating system. Generally, program modules include routines, programs, components, and data structures, which perform particular tasks or implement particular abstract data types. The embodiments may also be practiced in distributed computing environments where tasks are performed by remote processing devices that are linked through a communications network. In a distributed computing environment, program modules may be located in both local and remote memory storage devices.

FIG. 1 illustrates an example DPS 100 that comprises one or more processor modules or processor(s) 102 and 106 that include one or more central processing units (CPU), of which CPUs 104 and 107 are illustrated. Throughout the description herein, the terms CPU and processor can be utilized interchangeably as referring to the same component. Processor 102 further includes cache subsystem 104, and processor 106 includes cache subsystem 108. Cache subsystems 104 and 108 can comprise one or more levels of caches, such as an L1 cache and an L2 cache, and one or more of the lower levels of caches, which can be a shared cache. Processors 102 and 106 are coupled to a system interconnect fabric 114 that couples other components of DPS 100 to processors 102 and 106. Interconnect fabric 114 can be an address and data bus, in one embodiment.

Figure 3A:
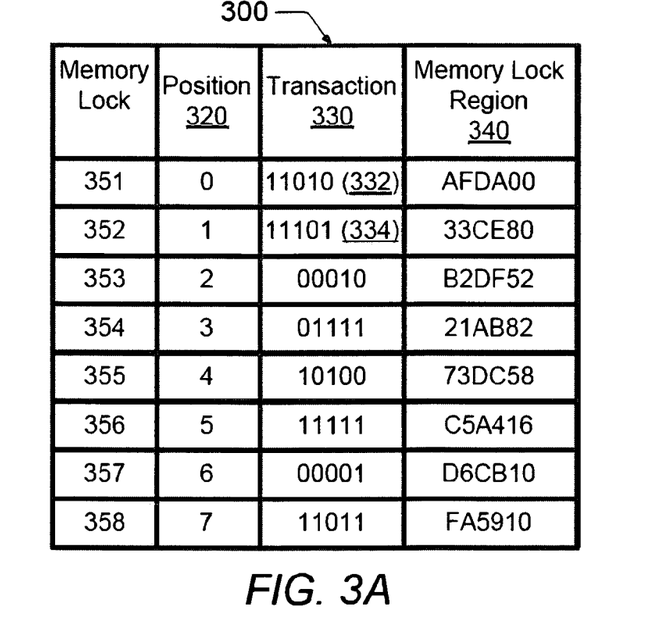
FIG. 3A illustrates an example of a FIFO memory lock register, in accordance with one or more embodiments.

Processor(s) 102 includes a scheduler 160 that schedules the execution of multiple threads such as thread 1 162 and thread 2 164 for execution on CPU 103. Scheduler 160 contains logic that determines the order and timing of the execution of threads 162 and 164. In a first embodiment, processor(s) 102 further includes a hardware implemented memory lock reset module 170. Memory lock reset module 170 contains logic that allows memory locks to be reset from a locked state back to a transactional memory state. Resetting the removed memory lock to return to a transactional memory state allows access to the associated region of memory by a next requesting transaction. A memory lock restricts access to shared data to a specific thread. The memory lock guarantees that a specific thread has exclusive access to shared data for a section of code. The memory lock indicates to thread 1 162 and thread 2 164 that thread 1 162 has exclusive access to the memory region. In a transactional memory state, a thread completes modifications to shared memory without regard for what other threads might be doing, recording every read and write that it is performing in a log. After the transaction is completed, a verification process verifies that other threads have not concurrently made changes to memory that it accessed in the past. If verification is successful, the read or write is made permanent. Memory lock reset module 170 contains a memory lock register 172 that contains memory locks 351-358 (FIG. 3A). Memory lock register 172 is a first in first out (FIFO) que or register.

System memory 120 is coupled to system interconnect fabric 114 via a memory controller 110. System memory 120 can include therein a plurality of modules and routines, including operating system (O/S) 122, firmware (F/W) 124, software (S/W) 126, and data 128. The various software and/or firmware modules have varying functionality when their corresponding program code is executed by CPU 103 and 107 within DPS 100.

DPS 100 can further include physical computer readable storage media 130 (or storage) such as hard disk drives. Storage media 130 can also include solid state storage devices, optical drives and other physical storage devices. DPS 100 can also include input/output devices and corresponding controllers, generally represented as I/O 140, and a network interface card (NIC) 150, among other components. NIC 150 enables DPS 100 to connect to and communicate with other remote devices and networks. I/O 140 can include a display controller 132 that is in communication with one or more display(s) 144. Display controller 132 is a graphics or video controller that can control at least a portion of the content shown on display(s) 144. I/O 140 can further include input devices 146 such as a keyboard or mouse that allow a user to make selections and provide input to DPS 100.

Figure 2:
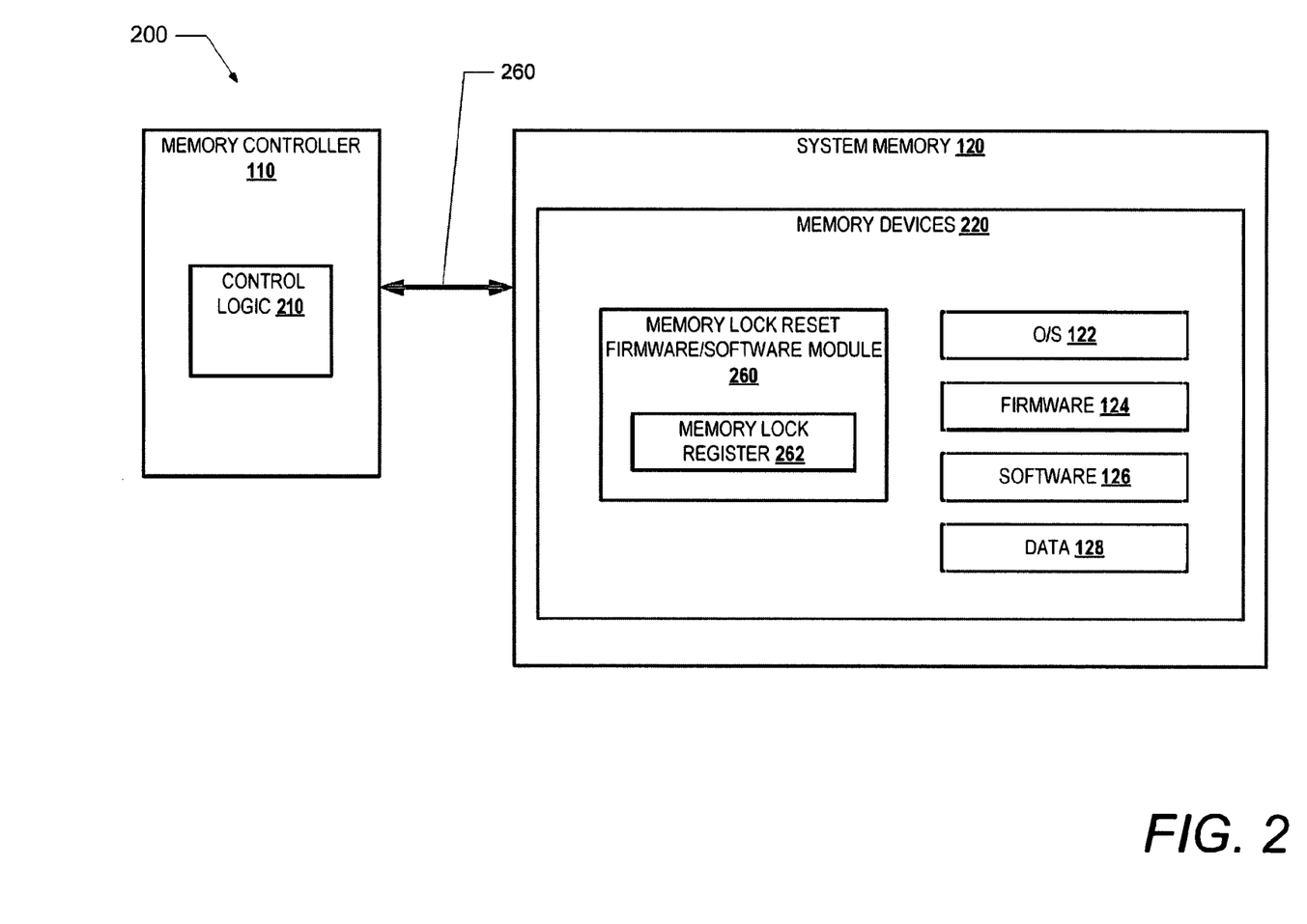
FIG. 2 illustrates a block diagram of an example memory system, in accordance with one or more embodiments.

With reference now to FIG. 2, there is illustrated one embodiment of memory subsystem 200. In the discussion of FIG. 2, reference is also made to elements described in FIG. 1. Memory subsystem 200 includes memory controller 110 and system memory 120. System memory 120 comprises one or more memory chips or devices 220 that can be accessed by memory controller 110 via a memory address and data bus 260. Memory devices 220 can include DRAM devices or non-volatile memory devices such as NAND flash devices. Operating system (O/S) 122, firmware (F/W) 124, software (S/W) 126 and data 128 can be stored in and retrieved from system memory 120 through the operation of read and write commands.

Memory controller 110 comprises control logic 210 necessary for reading from and writing to memory devices 250. Each of the memory controller components can communicate with each other via a communication fabric, which includes specific messaging signals communicated over specific signal lines (not illustrated).

Functions, modules, routines, methods and processes of the present disclosure can be provided as firmware code and/or logic stored on system memory 120 and executed on processor 102. System memory 120 includes memory lock reset firmware/software module 260. The firmware code and logic can implement memory lock reset firmware/software module 260.

In the first embodiment, memory lock reset module 170 was described as containing hardware implemented logic that allows memory locks to be reset from a locked state back to a transactional memory state. In a second embodiment, the memory lock reset module can be implemented in firmware/software. Memory lock reset firmware/software module 260 contains program code that when executed by processor 102 allows memory locks to be reset from a locked state back to a transactional memory state. Resetting the removed memory lock to return to a transactional memory state allows access to the associated region of memory by a next requesting transaction. Memory lock reset firmware/software module 260 contains a memory lock register 262 that contains memory locks. Memory lock register 262 is a first in first out (FIFO) que or register. In another embodiment, memory lock reset module 260 can be part of operating system 122.

The functions, methods and processes of the present disclosure can be implemented either as a hardware embodiment by memory lock reset module 170 or as a software embodiment by memory lock reset firmware/software module 260 that is executed by processor 102.

In one embodiment, processor 102 resolves memory collisions or contests between thread 1 162 and thread 2 164 and sets at least one memory lock during execution of a transaction. In one embodiment, a dedicated process that is part of the operating system can run on processor 102 that resolves memory collisions. Processor 102 selects a transaction associated with one of the threads that is to be locked to the colliding or contested memory lock region address and generates a new memory lock corresponding to a pairing of the transaction and memory lock region. The transaction acquires access to a region of memory 120. When the transaction is associated with thread 1 162, the memory lock indicates to thread 1 162 and thread 2 164 that thread 1 162 has temporary exclusive access to the memory region. Processor 102 determines if FIFO memory lock register 172 is full of memory locks. In response to the FIFO memory lock register 172 being full of memory locks, module 170 or 260 removes the memory lock occupying the tail position (i.e., the oldest memory lock in the FIFO register) from the FIFO memory lock register 172. The removed memory lock is reset to return to a transactional memory state. After the memory lock has been reset, the region of memory associated with the memory lock is available for use by any transaction. The remaining memory locks are shifted one position towards the tail of the FIFO register 172 and the new memory lock is added to a head position in the FIFO memory lock register 172. Notably, when then FIFO register is not full, the module 170 or 260 places/inserts the new memory lock at the head of the FIFO memory lock register and no memory lock is removed from the FIFO memory lock register.

Those of ordinary skill in the art will appreciate that the hardware components and basic configuration depicted in FIGS. 1 and 2 and described herein may vary. For example, the illustrative components within DPS 100 are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure. The example data processing systems depicted in FIG. 1 may be, for example, an IBM eServer pSeries system, a product of International Business Machines Corporation in Armonk, N.Y., running the Advanced Interactive Executive (AIX) operating system (Trademark of IBM Corporation) or LINUX operating system (Trademark of Linus Torvalds).

Figure 3B:
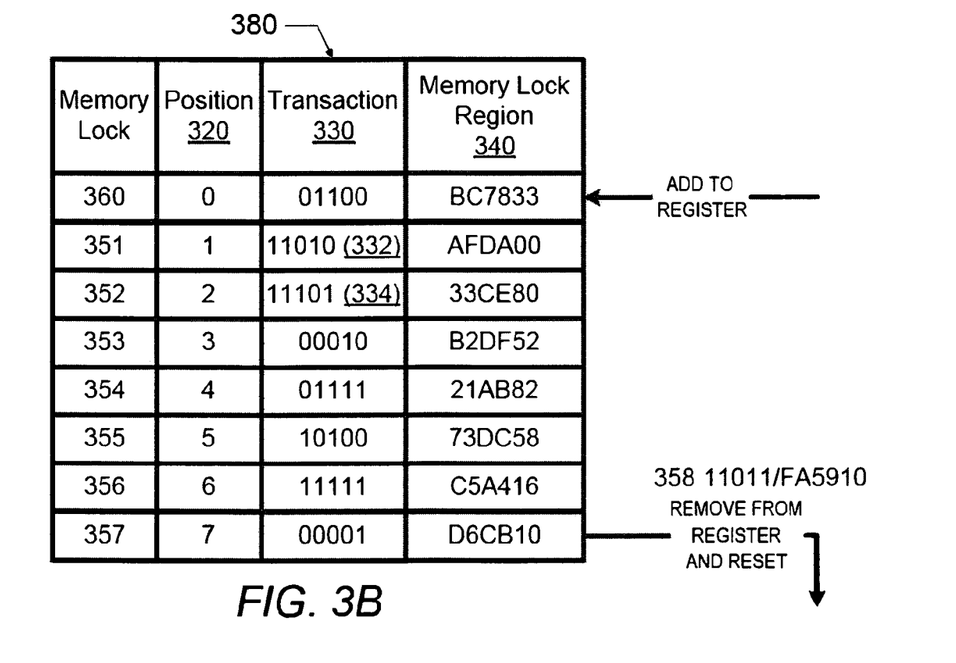
FIG. 3B illustrates another example of a FIFO memory lock register, in accordance with one or more embodiments.

FIGS. 3A and 3B illustrate examples of FIFO memory lock registers. In the discussion of FIGS. 3A and 3B, reference is also made to elements described in FIG. 1 and FIG. 2. FIG. 3A comprises a filled FIFO memory lock register 300 that includes rows of memory locks 351-358. Each of the memory locks 351-358 is held within an entry of the FIFO register 300 that has a corresponding register position 320. Memory lock 351 occupies the first or head position (position 0, which holds the most recently added memory lock) and memory lock 358 occupies the end or tail position (position 7, which represents the oldest memory lock among all memory locks added to the register). Each of the memory locks 351-358 comprises a transaction 330 and memory lock region 340 pair. Transaction 330 identities the section of code or a set of program instructions that is designated as a transaction. Each transaction 330 is associated with a specific thread such as thread 162 and 164. For example, a transaction 332 can be associated with thread 162 and a transaction 334 can be associated with thread 164. Memory lock region 340 identifies the region of system memory 120 that has been protected for access by the associated transaction 330. Memory locks 351-358 ensure that the associated thread has temporary exclusive access to the memory region for a transaction.

FIG. 3B illustrates another FIFO memory lock register 380. FIFO memory lock register 380 is similar to FIFO memory lock register 300 except that a new memory lock 360 has been added to the head position 0 of the register. Adding the new memory lock 360 to the head position 0 of the register causes all of the remaining memory lock entries in the register to be shifted down one position toward the tail position 7 in the register. The memory lock 358 in the tail position 7 of the register is removed from FIFO memory lock register 380 and reset, allowing memory lock 358 to return to a transactional memory state.

Figure 4:
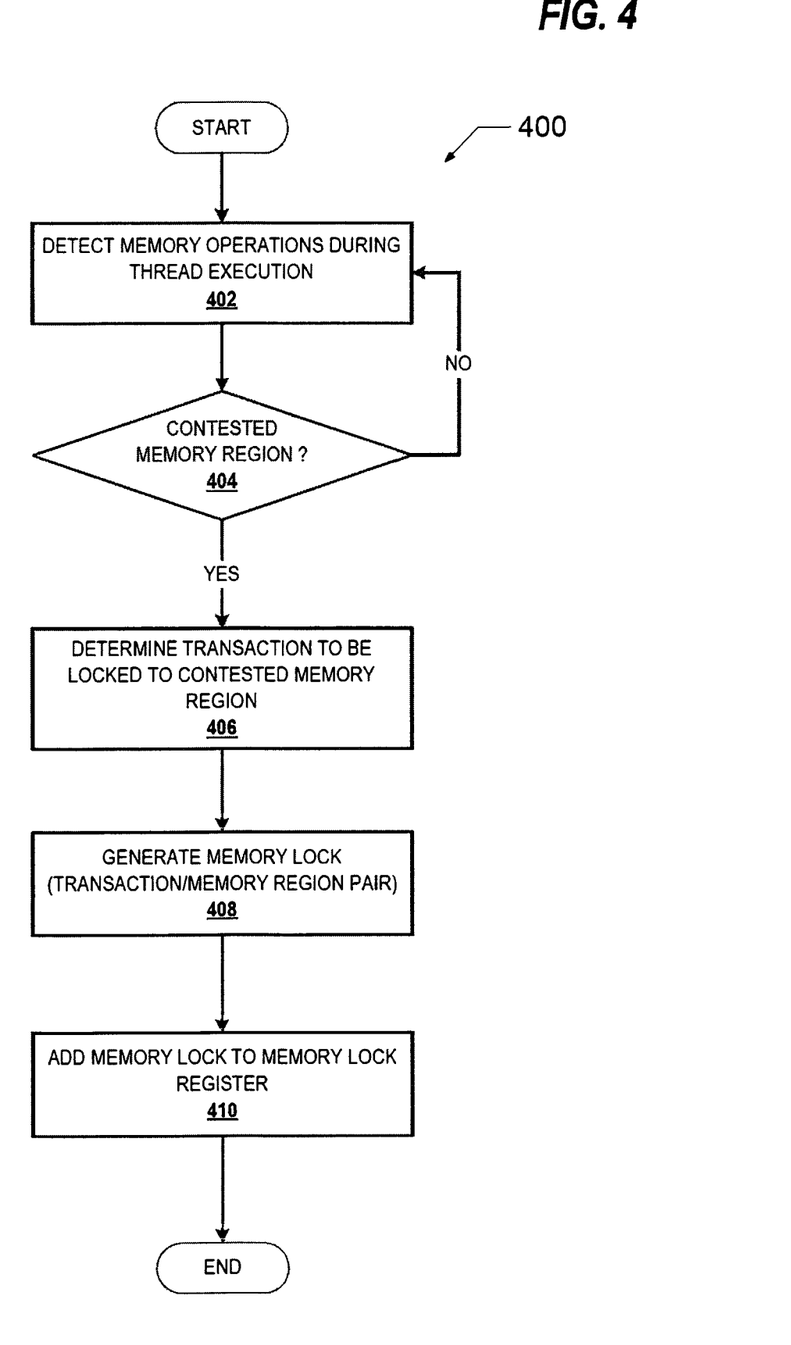
FIG. 4 is a flow chart illustrating one example of a method of resolving contests between threads accessing a memory region.
Figure 5:
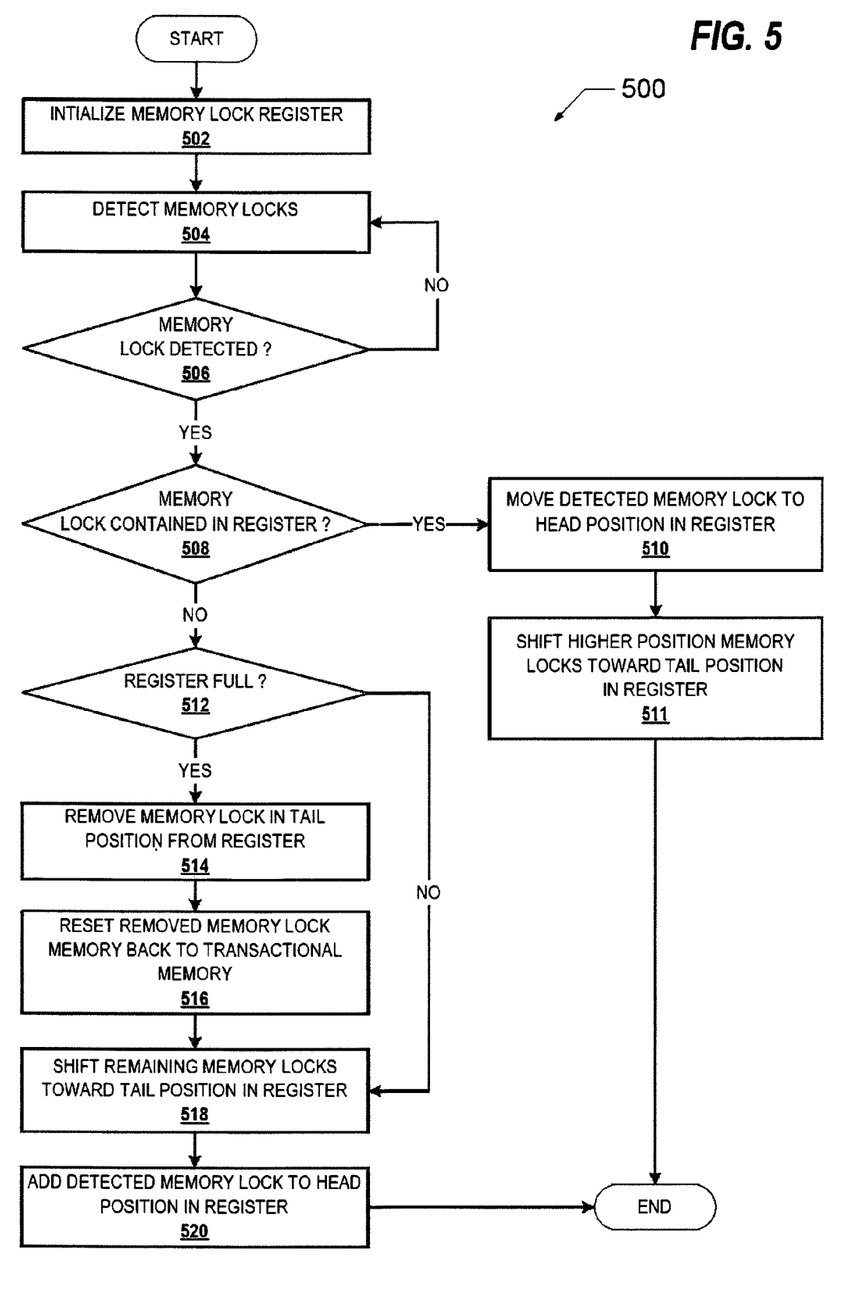
FIG. 5 is a flow chart illustrating one example of a method of resetting memory locks in a transactional memory system.

FIGS. 4 and 5 illustrate flowcharts of exemplary processes for resolving collisions or contests between threads accessing a memory region and resetting memory locks in a transactional memory system. Computer implemented methods 400 and 500 can be implemented in DPS 100. The description of the method is provided with general reference to the specific components illustrated within the preceding figures. In the discussion of FIGS. 4 and 5, reference is also made to elements described in FIGS. 1-3. Generally the methods are described as being implemented via processor 102 (scheduler 160 and memory lock reset module 170) or implemented via processor 106 and particularly the execution of code provided by memory lock reset firmware/software module 260 acting within processor 106. It is however appreciated that certain aspects of the described methods may be implemented via other processing devices and/or execution of other code.

Turning to FIG. 4, method 400 is a method for resolving collisions or contests between threads accessing a memory region. Method 400 begins at the start block and proceeds to block 402 where processor 102 detects memory operations during the execution of transactions 330 such as transaction 332 by thread 162 and transaction 334 by thread 164. At decision block 404, processor 102, determines if any memory regions of system memory 120 have more than one transaction 330 that is attempting to access the region of memory. In response to none of the memory regions being contested, method 400 returns to block 402 to continue detecting memory operations during the execution of transactions 330. In response to at least one of the memory regions being contested, memory lock reset module 170 of processor 102 selects which transaction 330 is to be locked to the contested memory lock region address 340 (block 406) and generates a new memory lock 360 corresponding to a pairing of the selected transaction 330 and memory lock region 340 (block 408). Processor 102 adds the new memory lock 360 to the head of the FIFO memory lock register 172 (block 410). Method 400 then ends.

FIG. 5 illustrates a flowchart of an exemplary method 500 for resetting memory locks in a transactional memory system. Method 500 begins at the start block and proceeds to block 502 where processor 102 initializes FIFO memory lock register 172. In one embodiment, initialization of FIFO memory lock register 172 occurs during the start-up of DPS 100 and includes clearing any entries in FIFO memory lock register 172. Processor 102 detects the generation of memory locks 351-358 occurring from threads 162, 164 contesting one or more memory regions during transactions 332 and 334 (block 504). Processor 102 determines if a memory lock has been detected (decision block 506). In response to no memory lock being detected, method 500 returns to block 504 to continue monitoring for detection of memory locks during the execution of transactions 330. In response to at least one memory lock being detected, processor 102 identifies if the detected memory lock is already contained in FIFO memory lock register 172 (decision block 508).

In response to the detected memory lock being in the FIFO memory lock register 172, processor 102 moves the detected memory lock from a current position to the first or head position 1 in FIFO memory lock register 172 (block 510). Processor 102 shifts the memory locks having a higher position in the FIFO memory lock register than the detected memory lock one position towards the tail position of the FIFO memory lock register (block 511). For example, if memory lock 354 was the detected memory lock already in FIFO memory lock register 172, processor 102 would move memory lock 354 from position 4 to head position 1 and shift each memory lock 351, 352 and 353 one position downward in FIFO memory lock register 172 toward the tail position. Method 500 then terminates.

At decision block 580, in response to the detected memory lock not being in the FIFO memory lock register 172 (i.e., a new memory lock 360) processor 102 determines if the FIFO memory lock register 172 is full (decision block 512). In response to the FIFO memory lock register 172 not being full, processor 102 shifts all of the existing memory locks down one position (block 518) and adds the new detected memory lock to the first or head position 1 in FIFO memory lock register 172 (block 520). Method 500 then ends.

From decision block 512, in response to the FIFO memory lock register 172 being full, processor 102 removes the memory lock in the end or tail position 8 (i.e., memory lock 358) from FIFO memory lock register 172 (block 514). Processor 102 releases or resets the removed memory lock 358 to return to a transactional memory state (block 516). After the memory lock 358 has been reset, the memory region 340 associated with memory lock 358 is available for use by any transaction 330. In one embodiment, transactions 332 and 334 can contest for the same region of memory that was just reset, provided that either one of the contested transactions 332 or 334 has not been completed. Processor 102 shifts the remaining memory locks 351-357 in the FIFO memory lock register 172 one position towards the tail position of the FIFO memory lock register (block 518).

Processor 102 then adds the new detected memory lock 360 to the empty first or head position 1 in FIFO memory lock register 172 (block 520). Method 500 then ends.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method of managing locks within a memory system, the method comprising:
   a processor setting at least one new memory lock during execution of a transaction that acquires access to a region of memory, the at least one new memory lock indicating that the transaction and its associated thread has exclusive temporary access to the memory region;
determining if a first in first out (FIFO) memory lock register is full of memory locks; and
in response to the FIFO memory lock register being full:
   removing a memory lock from a tail position of the FIFO memory lock register;
   resetting the removed memory lock to return to a transactional memory state; and
   adding the at least one new memory lock to a head position in the FIFO memory lock register.

2. The method of claim 1, further comprising:
determining if an existing memory lock contained within the current FIFO memory lock register is a same lock as the at least one new memory lock; and
in response to determining that an existing memory lock contained within the FIFO memory lock register is the same as the at least one new memory lock being added to the FIFO memory lock register, removing and discarding the existing memory lock from a current position in the FIFO memory lock register.

3. The method of claim 1, further comprising:
shifting at least one existing memory lock having a higher position in the FIFO memory lock register than the removed memory lock one position towards the tail position of the FIFO memory lock register prior to adding the at least one new memory lock to the head position of the FIFO memory lock register.

4. The method of claim 1, further comprising:
prior to adding the at least one new memory lock to the head position of the FIFO memory lock register, shifting each other remaining memory lock in the FIFO memory lock register one position towards the tail position in the FIFO memory lock register.

5. The method of claim 1, wherein resetting the removed memory lock to return to a transactional memory state allows access to the associated region of memory by a next requesting transaction.

6. The method of claim 1, further comprising:
in response to the FIFO memory lock register not being full:
   shifting at least one existing memory lock in the FIFO memory lock register one position towards the tail position of the FIFO memory lock register; and
   adding the at least one new memory lock to the head position of the FIFO memory lock register.

7. The method of claim 1, wherein the processor further comprises a memory lock module that includes the FIFO memory lock register.

* * * * *